United States Patent [19]

Kumabe et al.

[11] 3,907,928

[45] Sept. 23, 1975

[54] POLYVINYL CHLORIDE RESIN COMPOSITION

[75] Inventors: Hirohide Kumabe, Musashino; Akio Morimoto; Yozo Kitagawa, both of Yokkaichi; Nobuhide Shiraishi, Yokohama, all of Japan

[73] Assignee: Japan Synthetic Rubber Co., Ltd., Japan

[22] Filed: Sept. 14, 1973

[21] Appl. No.: 397,330

Related U.S. Application Data

[63] Continuation of Ser. No. 177,159, Sept. 1, 1971, abandoned.

[52] U.S. Cl............ 260/876 R; 260/880 R; 260/881
[51] Int. Cl.².................. C08L 55/02; C08L 57/08
[58] Field of Search........... 260/876 R, 880 R, 881, 260/885

[56] References Cited
UNITED STATES PATENTS

| | | | |
|---|---|---|---|
| 3,018,268 | 1/1962 | Daly | 260/876 R |
| 3,287,443 | 10/1966 | Saito et al. | 260/876 R |

*Primary Examiner*—John C. Bleutge
*Assistant Examiner*—J. Ziegler
*Attorney, Agent, or Firm*—Toren & McGeady

[57] ABSTRACT

The present invention relates to a polyvinyl chloride resin composition prepared by mixing polyvinyl chloride resin with a graft polymer which is produced by grafting methyl methacrylate, styrene and acrylonitrile to a styrene-butadiene copolymer.

More particularly, the present invention relates to a polyvinyl chloride resin composition prepared by mixing polyvinyl chloride resin with a graft polymer and, in the preparation of the latter from styrene-butadiene copolymer methyl methacrylate, styrene and acrylonitrile, the styrene-butadiene copolymer latex is first treated by heating and agitating under a specified condition at least in the presence of a certain amount of methyl methacrylate, and then the remainder of methyl methacrylate, styrene and, acrylonitrile is added in the presence of polymerization initiator until the polymerization reaction is completed. The polyvinyl chloride resin composition can provide molded matters having excellent impact resistance and superior transparency in a wide range of molding conditions, for example, by the blow molding process.

3 Claims, No Drawings

POLYVINYL CHLORIDE RESIN COMPOSITION

This is a continuation of application Ser. No. 177,159, filed Sept. 1, 1971, now abandoned.

The present invention relates to a polyvinyl chloride resin composition. More particularly, the present invention provides a polyvinyl chloride composition of superior impact resistance and transparency over a wide range of molding conditions in a blow molding process, composed of a polyvinyl chloride resin and a polymer which is obtained by graft polymerization of methyl methacrylate (designated hereinafter as MMA) and styrene (designated hereinafter as ST) to a styrene-butadiene copolymer, or graft polymerization of MMA, ST and acrylonitrile (designated hereinafter as AN) to a styrene-butadiene copolymer.

Polyvinyl chloride resin is one of those plastics which are most widely used owing to its superior transparency and the corrosion resistance and also low cost of production, but the inferior impact resistance is a drawback. Therefore, attempts have been made to improve the impact resistance of polyvinyl chloride resins. The attempts have been conventionally made by mixing polyvinyl chloride resin with styrene-butadiene copolymer or with a polymer prepared by graft polymerization of MMA and ST onto styrene-butadiene copolymer (the resulting polymer is designated hereinafter as graft polymer). In comparison, the polymer obtained by the latter method has better transparency and impact resistance and thus is used as reinforcing polymer for improving the impact resistance of polyvinyl chloride resins. In this connection, the most important is the method of grafting MMA and ST onto the butadiene polymer. Thus, such properties as transparency and impact resistance of a polyvinyl chloride resin composition containing graft polymer remarkably depend on both monomer composition and process of the graft polymerization. On that account, investigations on the suitable graft monomer compositions and the process of graft polymerization are being carried out in the related field. As a result, several patents have been issued concerning the polyvinyl chloride resin composition to which was admixed a graft polymer prepared from a particular graft monomer composition and a particular process of polymerization. They include, for example, Japanese Patent Publications Nos. 34-8136, 39-19035, 42-10735, 42-19248 and 42-20847.

The present inventors noted the excellent property, as an improving polymer of polyvinyl chloride resins, of the graft polymer thus obtained, and after investigations completed a novel method of graft polymerization which is entirely different from the conventional methods. The polyvinyl chloride resin compositions, prepared by mixing the graft polymer obtained by the novel graft polymerization mentioned above with a polyvinyl chloride resin, have been found to have excellent impact resistance and transparency over a wide range of molding conditions in the blow molding process.

According to the present invention 40 to 70 parts by weight of graft monomers are grafted onto 30 to 60 parts by weight as solid rubber material of styrene-butadiene copolymer latex (herein called SBR latex). The graft monomers comprise 30 to 70% by weight of MMA, 70 to 30% by weight of ST and 0 to 20% by weight of AN, and the SBR latex contains less than 50%, preferrably 10 to 45% by weight of combined styrene and more than 80% by weight of the polymer particles (rubber particles) has particle size smaller than $0.15\mu$.

The SBR latex is agitated at a temperature from 60° to 95°C for 0.5 to 7 hours in the presence of 15 to 85% by weight of MMA used for the polymerization. In this case it is preferable that a part or all of AN used for the graft polymerization is present with MMA in the agitation, although it is possible that all of AN used for the polymerization is added to the mixture together with the remainder of MMA and all of ST. The remainder of MMA, AN and ST is successively, or rather continuously, added for more than 2 hours to the mixture in the presence of an initiator of the polymerization and the polymerization is completed. The final product, polyvinyl chloride resin composition is obtained by blending of 5 to 30 parts by weight of the thus obtained graft polymer and 95 to 70 parts by weight of polyvinyl chloride resin. The molded articles therefrom are featured by their excellent impact resistance and transparency over a wide range of molding conditions in the blow molding process.

The most predominant feature of this invention lies in that 15 to 85% by weight of MMA to be used in the graft polymerization is mixed with the latex prior to the initiation of graft polymerization and agitated for 0.5 to 7 hours at a temperature from 60°–95°C. Only when the pretreatment is taken before the graft polymerization, an excellent polymer is obtained for improving polyvinyl chloride resin composition. In order to achieve excellent transparency of the polyvinyl chloride resin composition containing the graft polymer, the reflactive index of the graft polymer should be similar to that of the polyvinyl chloride resin and moreover the diameter of particles of the graft polymer which are dispersed in the polyvinyl chloride resin should be as small as possible in comparison with the wavelengths of visible light. However, satisfaction of only the above conditions is not sufficient to attain excellent transparency of the molded articles prepared by the blow, extrusion, injection and other molding processes, and the method itself for preparing the graft polymer should be appropriate, or in other words, the surface of the rubber particles should be tightly grafted so as to avoid opaque molded articles. Occurrence of opaque molded articles is remarkable in the molding, especially when the molding is performed at a high temperature. This is one of the most serious problems when bottles are produced from the polyvinyl chloride resin composition containing a graft polymer by the blow molding process. The opaqueness of the article originates from the rough surface, thus virtually transparent materials look opaque due to scattering of light. Graft polymers having rough surface can only be used for molding at a low temperature and is therefore not suitable to the blow molding process. In this respect, the inventors of this invention have revealed in their investigations that smooth surface of the polyvinyl chloride resin composition containing graft polymers can be procured by keeping a high degree of grafting in the process for forming the graft polymer so that the surface of the rubber particles in the latex is grafted as densely as possible.

On the other hand, the necessary condition to have excellent impact resistance for the polyvinyl chloride resin composition containing graft polymer is that the graft polymer is adequately miscible with the polyvinyl chloride resin and that the particles of the graft polymer dispersed in the polyvinyl chloride resin are of a certain appropriate size.

In conclusion, the impact resistance and the transparency of the polyvinyl chloride resin compositions are imcompatible properties, since, as has been already described, the particles of graft polymer dispersed in the polyvinyl chloride resin should be as small as possible in comparison with the wavelengths of visible light. The polyvinyl chloride resin composition of the present invention satisfies the two conflicting properties and affords molded products prepared by the blow molding process which have excellent transparency over a wide range of molding conditions.

The most remarkable feature of this invention that 85 to 15% by weight of MMA is mixed with latex and stirred for 0.5 to 7 hours at a temperature from 60° to 95°C is necessary to give excellent transparency as well as excellent impact resistance over a wide range of molding conditions to the polyvinyl chloride resin composition containing graft polymer. In other words, the process is effective to prevent the deteriorated surface of the molded products.

Since MMA and AN are slightly soluble in water, it is probable that they should influence the emulsion state of latex and make the latex unstable and, as a result, the rubber particles in the latex readily agglomerate each other. When the graft polymerization is carried out under this condition, the monomers are densely grafted onto the surface of rubber particles in the latex.

Unless the latex is mixed and stirred with MMA prior to the graft polymerization, molded articles made of the polyvinyl chloride resin composition containing the graft polymer thus obtained, for example by the blow molding process at the cylinder temperature 170° to 200°C, have a rough surface which results in insufficient transparency.

To establish the index for determining whether a smooth surface of molded products is obtained or not in the blow molding process, thermal testing of the graft polymer by rising temperature was employed using a flow tester to measure the temperature at which the surface of extruded material became rough. While the temperature was being elevated from 170°C at a rate of 3°C/min., the surface of the polymer material that was extruded with a load 30 to 40 kg/cm$^2$ was observed every 5 minutes. A graft polymer whose surface becomes rough at a high temperature (designated hereinafter as the roughening temperature) gives, when mixed with a vinyl chloride resin, a composition which can give molded materials having less tendencies of surface deterioration when molded by the blow process etc., and having excellent transparency over a wide range of molding conditions. The roughening temperature of the graft polymer obtained by the present invention is mostly above 190°C, and it is about 220° to 240°C if the most appropriate condition is chosen for the graft polymerization. So far as a polyvinyl chloride resin composition contains, the graft polymer having such a high coarsening temperature, it is possible to obtain molding materials whose surface does not become rough and retains transparency over a wide range of molding conditions by the blowing process etc.

The polyvinyl chloride resins according to the present invention include homopolymer of vinyl chloride and copolymers composed of vinyl chloride as major constituent and one or more monoolefin monomers copolymerizable therewith.

In conventional arts where the graft polymerization of the present invention is not applied such as, for example, in Japanese Patent Publication Nos. 34-8136, 39-19035, 42-10735 and so on, the graft polymerization is carried out with latex mixed with MMA, ST and AN in the presence of polymerization initiator without mixing the latex with either MMA or a mixture of MMA and AN prior to the graft polymerization. These procedures can hardly elevate the roughening temperature of the graft polymer and thus the temperature mostly remains below 175°C, and does not reach 200°C even by selection of the best condition as revealed through experiments conducted by the present inventors. For instance, if the best condition is selected to produce a graft polymer having a roughening temperature close to 200°C, the polyvinyl chloride resin composition containing the graft polymer mentioned above shows inferior impact resistance in comparison with that of the polyvinyl chloride resin composition which contains the graft polymer prepared by the process of this invention.

In practising the present invention, such a wellknown treatment in the emulsion polymerization as using an alkali and/or electrolyte and a molecular weight regulator may be employed. For the polymerization initiator, it may be added in the total amount at once at the initiation of the graft polymerization, or it may be added successively during graft polymerization or it may be added in the combination of the two manners above.

Further stabilizers, lubricant and ultraviolet ray absorbers may be added to the compositions of this invention.

The feature and the results of the present invention will be explained in detail as follows:

1. The amount of styrene to be combined in styrene-butadiene copolymer used for preparing the graft polymer should be less than 50% by weight. Otherwise, only insufficient elasticity of the graft polymer results, therefore, impact resistance of the polyvinyl chloride resin composition can not be improved sufficiently. The prefered amount of styrene is 10 to 45% by weight.

2. More than 80% by weight of the above styrene-butadiene copolymer should consist of particles having a diameter smaller than 0.15$\mu$. Otherwise, transparency of the polyvinyl chloride resin composition containing the graft polymer is spoiled.

3. The styrene-butadiene copolymer should exist in an amount from 30 to 60 parts by weight to 100 parts by weight of the graft polymer. If the amount of styrene-butadiene copolymer is less than 30 parts by weight, impact resistance of the polyvinyl chloride resin composition containing the graft polymer is not be improved sufficiently. On the other hand, more than 60 parts by weight of the copolymer causes predominance of ungrafted rubber and thus decreased immiscibility with polyvinyl chloride resin and only poor impact resistance, transparency and weathering properties are obtained.

4. The composition of the monomer components to be grafted to the styrene-butadiene copolymer should be 30 to 70% by weight of MMA, 70 to 30% by weight of ST and 0 to 20% by weight of AN. If the amount of MMA is below 30% by weight, the difference in refractive index between the graft polymer and the polyvinyl chloride resin becomes considerable, so that transparency of the polyvinyl chloride resin composition containing the graft polymer is deteriorated. On the other hand, if MMA is over 70% by weight, transparency of the polyvinyl chloride resin composition containing the graft polymer is reduced from the same reason as above, and in addition the impact resistance becomes practically insufficient. Further, over 20% by weight of AN, molded articles produced, for example, by the blow molding process are remarkably colored and their weathering-property is degraded. Therefore, the object of this invention can be attained only by choosing adequate proportions of the component materials.

5. The amount of the monomers to be added to the latex prior to the graft polymerization should be either 85 to 15% by weight of MMA, or 85 to 15% of MMA and 0 to 100% of AN used for the graft polymerization.

With the amount over 85% by weight of MMA used for the graft polymerization, impact resistance and transparency of the polyvinyl chloride resin composition containing the graft polymer thus obtained is not sufficient practically. On the contrary, with the amount less than 15% of MMA, impact resistance is insufficient for the practical purposes and, at the same time, the roughening temperature is lowered too much to assure excellent transparency of the molded articles produced by the blow molding process.

The preferred amount lies in the range from 25 to 65% by weight of MMA used for the graft polymerization. When AN is used together with MMA, impact resistance of the polyvinyl chloride resin composition containing the graft polymer can be further improved.

6. The period during which the latex is mixed and stirred with either MMA or a mixture of MMA and AN prior to the graft polymerization should be 0.5 to 7 hours. If it is shorter than 0.5 hour, the effect of treatment can not be fully exhibited thus causing lowered roughening temperature of the graft polymer and insufficient transparency of the molded matters of the polyvinyl chloride resin composition containing the graft polymer. On the other hand, with the stirring for longer than 7 hours, the effect of mixing and stirring is excessive, so that inferior transparency results, though the roughening temperature of the graft polymer is sufficiently high and the impact resistance of the polyvinyl chloride resin composition is fully developed for the practical purpose.

7. The temperature for mixing and stirring latex with either MMA or a mixture of MMA and AN prior to the graft polymerization should be over 60°C. Otherwise, the roughening temperature of the graft polymer is too low and excellent transparency can not attained with the molded articles produced, for example by the blow molding process, from the polyvinyl chloride resin composition containing the graft polymer. On the other hand, a temperature over 95°C is not suitable because of large tendency of coagulating and colouring of the graft polymer and because of necessity of a high pressure apparatus for the treatment carried out at a temperature close to the boiling point of water used as the polymerization medium. From these reasons, the operation should be conducted usually at a temperature 60° to 95°C, preferably between 70° and 85°C.

8. The graft polymerization should be carried out while the remaining amount of MMA, AN and ST used for mixing with the latex prior to the graft polymerization is successively or rather continuously added for more than 2 hours in the presence of polymerization initiator. These monomers may be added either alone or in a mixture. If the addition of the monomers is completed in less than 2 hours, the grafting is so incomplete that the surface of rubber particles in the latex is not densely grafted and, as a result, the graft polymer shows a low roughening temperature, the polyvinyl chloride resin composition has practically insufficient impact resistance, and furthermore excellent transparency can not be expected with the molded articles produced, for example, by the blow molding process.

9. The polyvinyl chloride resin composition containing the graft polymer should preferably contain, 70 to 95 parts of polyvinyl chloride resin, hence the balance being 30 to 5 parts of the graft polymer per 100 parts by weight of the composition. If the graft polymer content is less than 5 parts by weight, the impact resistance can not be fully developed to the practical purposes. For with the amount more than 30 parts, on the contrary, impact resistance is also decreased accompanied with decreased weathering-property and transparency.

The present invention will be explained in more detail referring to the following examples, but the present invention should not be limited to those examples. In the following examples, all parts and percentages are in by weight.

EXAMPLE 1

200 parts of latex of which 92% of the particles were of a diameter of less than 0.15μ containing 22.5% of solid rubber materials consisting of 76.5% of butadiene and 23.5% of styrene, 2 parts of rosin soap and 7.5 parts of MMA were placed in a reaction vessel and agitated for 3 hours in a nitrogen atmosphere at 80°C.

Subsequently, 0.15 part of sodium salt of formaldehyde sulfoxylate (designated hereinafter as SFS) was added, and while the temperature inside being kept at 80°C 22.5 parts of MMA, 25 parts of ST and 0.4 part of diisopropylbenzene hydroperoxide (designated hereinafter as DIPBH) were added in small increments continuously for 5 hours. When the reaction was substantially completed, 3 parts of di-tert-butyl-p-cresol (designated hereinafter as BHT) was added in emulsion. After taking out of the reaction vessel the graft polymerized latex was coagulated with sulfuric acid, washed with water, dehydrated and dried to obtain powdery graft polymer A.

The polymer A, graft polymer produced by the process of this invention, was compared with a graft polymer that was produced by another process in order to demonstrate the advantage of this invention. The same amount of the same latex as in the case of A, mixed with 2 parts of rosin soap, was warmed at 80°C and mixed with 0.15 part of SFS, then 30 parts of MMA, 25 parts of ST and 0.4 part of DIPBH were added continuously for 5 hours. When the reaction substantially completed, 3 parts of BHT was added in emulsion and graft polymer B was obtained following the same process as for A. The properties of compositions prepared by mixing the graft polymers obtained in this and the following examples with polyvinyl chloride resin are shown in Table 1.

EXAMPLE 2

The same amount of the same latex as in Example 1, 2.0 parts of rosin soap and 15 parts of MMA were placed in a reaction vessel and agitated for 3 hours at 80°C. After addition of 0.15 part of SFS, 15 parts of MMA, 25 parts of ST and 0.4 part of DIPBH were added continuously for 5 hours. The product was taken out of the vessel when the reaction was substantially completed and graft polymer C was obtained in the same manner as in Example 1.

EXAMPLE 3

The same amount of the same latex as in Example 1, 2.0 parts of rosin soap and 20 parts of MMA were placed in a reaction vessel and agitated for 3 hours at 80°C. After addition of 0.15 part of SFS, 10 parts of MMA, 25 parts of ST and 0.4 part of DIPBH were continuously added for 4 hours. When the reaction was substantially completed, the product was taken out of the vessel and graft polymer D was obtained in the same manner as in Example 1.

of AN were placed in a reaction vessel and agitated for 3 hours at 80°C. After addition of 0.15 part of SFS, 13 parts of MMA, 25 parts of ST and 0.4 part of DIPBH were continuously added for 5 hours. When the reaction was completed, the product was taken out of the vessel and graft polymer G was obtained in the same manner as in Example 1.

EXAMPLE 7

Graft polymer H was prepared following the same process as in Example 2, except the 3 hours agitation at 70°C before the start of polymerization. Further, graft polymer I was prepared, for the sake of comparison, following the same process as in Example 2, except 3 hours agitation at 50°C before the start of polymerization.

Table 1

| Graft polymer Unit ASTM | 1) Roughening temperature °C | 2) Izod impact value kg-cm/cm² D256-56 | 3) Total light transmittance % D1003-61 | 4) Haze % D1003-61 | Remark |
|---|---|---|---|---|---|
| A | 195 | 39.5 | 66.8 | 5.1 | this invention |
| B | < 175 | 24.0 | 61.2 | 4.9 | for comparison |
| C | 225 | 71.4 | 63.7 | 5.6 | this invention |
| D | 230 | 42.3 | 60.8 | 6.0 | " |
| E | 230 | 72.5 | 60.5 | 6.0 | " |
| F | 200 | 56.0 | 63.6 | 5.6 | " |
| G | 220 | 82.2 | 61.0 | 5.2 | " |
| H | 205 | 52.0 | 62.0 | 5.0 | " |
| I | < 175 | | | | for comparison |
| Polyvinyl chloride | | 3.0 | 65.50 | 3.5 | " |

(1) The temperature at which the surface of the product extruded from the nozzle loses smoothness when the material was extruded with a load 30 to 40 kg/cm² using a flow tester and the temperature was elevated from the starting temperature of 170°C with a rate of 3°C/min.
(2) Measured on a test piece from a sheet prepared by first kneading the sample for 8 min. at the roller temperature 170°C and molding then for 25 min. at the press temperature 170°C.
(3) Measured with a haze meter on a sheet prepared by first kneading the sample for 8 min. at the roller temperature 170°C and then pressing it for 15 min. at the press temperature 170°C.
(4) The same as in (3).

EXAMPLE 4

The same amount of the same latex as in Example 1, 2.0 parts of rosin soap and 15 parts of MMA were placed in a reaction vessel and agitated for 5 hours at 80°C. After addition of 0.15 part of SFS, 15 parts of MMA, 25 parts of ST and 0.4 part of DIPBH were continuously added for 5 hours. When the reaction was substantially completed, the product was taken out of the vessel and graft polymer E was obtained in the same manner as in Example 1.

EXAMPLE 5

The same amount of the same latex as in Example 1, 2.0 parts of rosin soap and 15 parts of MMA were placed in a reaction vessel and agitated for 1.5 hours at 80°C. After addition of 0.15 part of SFS, 15 parts of MMA, 25 parts of ST and 0.4 part of DIPBH were continuously added for 5 hours. When the reaction was substantially completed, graft polymer F was obtained in the same manner as in Example 1.

EXAMPLE 6

The same amount of the same latex as in Example 1, 2.0 parts of rosin soap, 15 parts of MMA and 2 parts The izod impact value, total light transmittance and haze were estimated, except for polyvinyl chloride resin, on a composition prepared by thoroughly mixing 15 parts of the graft polymer of interest with a mixture consisting of 100 parts of vinyl chloride resin of the degree of polymerization 700, 3 parts of epoxy stabilizer, 2 parts of organic calcium, zinc and magnesium stabilizer and 1 part of organic phosphorous acid ester stabilizer.

As is seen in the table, the graft polymers prepared by the process of this invention have a higher roughening temperature than that of graft polymer B which was obtained by another process. As a result, the polyvinyl chloride resin composition which contains the graft polymer prepared by the process of this invention can afford molded articles of excellent transparency due to smooth surfaces, when the composition is molded, for example, by the blow molding process even at a high temperature close to 200°C. This is also true if the molding is performed at a relatively low temperature below 170°C. Therefore, the vinyl chloride resin composition of the present invention can provide molded products of excellent transparency in a wide range of molding conditions without causing rough surfaces to the products.

As for the impact resistance, the vinyl chloride resin composition of this invention remarkably improves the impact resistance of vinyl chloride resin. In table 1, the impact resistance values several times as large as that of Example B prepared by a process other than of this invention can be seen.

As is evident from the table and as is described at the beginning of the specification, the present invention provides polyvinyl chloride compositions that can afford molded articles of excellent impact resistance and transparency in a wide range of molding conditions when they are produced, for example, by the blow molding process.

What is claimed is:

1. Polyvinyl chloride resin composition prepared by mixing 95 to 70 parts by weight of polyvinyl chloride resin with 5 to 30 parts of the graft polymer which is produced from 30 to 60 parts by weight of solid rubber material based on 100 parts of the graft polymer of styrene-butadiene copolymer latex, in which the combined styrene amounts to less than 50% by weight, more than 80% by weight of the copolymer latex particles are of a particle diameter smaller than 0.15μ, and 70 to 40 parts by weight of monomers consisting of 30 to 70% by weight of methyl methacrylate, 70 to 30% by weight of styrene and 0 to 20% by weight of acrylonitrile, by graft polymerization comprising first mixing in the absence of an added polymerization initiator 85 to 15% by weight of methyl methacrylate used for the graft polymerization with the copolymer latex and agitating them for 0.5 to 7 hours at a temperature of 60° to 95°C and then adding the remainder of methyl methacrylate, styrene and acrylonitrile over more than a 2 hour period in the presence of a polymerization initiator until the polymerization is completed.

2. Polyvinyl chloride resin composition according to claim 1, wherein combined styrene amounts to 10 to 45% by weight in the styrene-butadiene copolymer that is used as base polymer to the graft polymer.

3. Polyvinyl chloride resin composition prepared by mixing 95 to 70 parts by weight of polyvinyl chloride resin with 5 to 30 parts by weight of the graft polymer that is produced from 30 to 60 parts by weight of solid rubber material based on 100 parts of the graft polymer of styrenebutadiene copolymer latex, in which combined styrene amounts to less than 50% by weight, and more than 80% by weight of the copolymer latex particles are of the particle diameter smaller than 0.15μ, and 70 to 40 parts by weight of monomers consisting of 30 to 70% by weight of methyl methacrylate, 70 to 30% by weight of styrene and 0 to 20% by weight of acrylonitrile, by graft polymerization comprising first mixing in the absence of an added polymerization initiator 85 to 15% by weight of methyl methacrylate used for the graft polymerization and a fraction or the total quantity of acrylonitrile with the copolymer latex and agitating them for 0.5 to 7 hours at a temperature of 60° to 95°C and then adding the remainder of methyl methylacrylate, styrene and acrylonitrile, over more than a 2 hour period in the presence of a polymerization initiator until the polymerization is complete.

* * * * *